(12) United States Patent
Satzke et al.

(10) Patent No.: US 9,684,706 B2
(45) Date of Patent: Jun. 20, 2017

(54) METHOD FOR MAPPING MEDIA COMPONENTS EMPLOYING MACHINE LEARNING

(71) Applicant: Alcatel Lucent, Boulogne Billancourt (FR)

(72) Inventors: Klaus Satzke, Tamm (DE); Stefan Wahl, Schwieberdingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 14/378,480

(22) PCT Filed: Jan. 28, 2013

(86) PCT No.: PCT/EP2013/051563
§ 371 (c)(1),
(2) Date: Aug. 13, 2014

(87) PCT Pub. No.: WO2013/120686
PCT Pub. Date: Aug. 22, 2013

(65) Prior Publication Data
US 2015/0066929 A1 Mar. 5, 2015

(30) Foreign Application Priority Data
Feb. 15, 2012 (EP) .................................... 12305171

(51) Int. Cl.
*G06F 17/30* (2006.01)
*G06F 9/50* (2006.01)
(Continued)

(52) U.S. Cl.
CPC ...... *G06F 17/30598* (2013.01); *G06F 9/5066* (2013.01); *G06N 99/005* (2013.01); *H04L 67/10* (2013.01); *H04L 67/327* (2013.01)

(58) Field of Classification Search
CPC .. G06F 17/30598; G06F 17/212; G06F 21/51; G06F 21/577; G06F 21/60;
(Continued)

(56) References Cited

U.S. PATENT DOCUMENTS

| 5,631,907 A | 5/1997 | Guarneri et al. |
| 5,724,345 A | 3/1998 | Guarneri et al. |

(Continued)

FOREIGN PATENT DOCUMENTS

| CN | 102012808 A | 4/2011 |
| CN | 102012936 A | 4/2011 |

(Continued)

OTHER PUBLICATIONS

Application Class of Service for Hybrid Cloud Computing Deployments, Disclosed Anonymously,Retrieved from IP.com, Apr. 21, 2010.*

(Continued)

*Primary Examiner* — Augustine K Obisesan
(74) *Attorney, Agent, or Firm* — Fay Sharpe, LLP

(57) ABSTRACT

The present document relates to cloud computing. In particular, the present document relates to methods and systems for cloud computing which enable the efficient and flexible placement of application components within a cloud. A computing device (101) is described. The computing device (101) is adapted to receive a plurality of component placement requests for one or more components (703) of a corresponding plurality of applications (700); determine a plurality of feature vectors (203) from the plurality of component placement requests, respectively; wherein each feature vector (203) comprises vector dimensions which describe different attributes of the respective component placement request: determine a plurality of placement decisions (205) regarding the plurality of component placement (Continued)

requests, respectively; wherein each placement decision (205) comprises an indication of one or more executing computing devices (101) onto which the one or more components (703) of the respective application (700) have been placed; cluster the plurality of feature vectors (203), thereby yielding one or more clusters (202); wherein each cluster (202) comprises a default feature vector (203) describing the different attributes of a default component placement request; determine a default placement decision (205) for each of the one or more clusters; and store the one or more default feature vectors and the respective one or more default placement decisions (205) in a database (204) of the computing device (101).

13 Claims, 5 Drawing Sheets

(51) Int. Cl.
*G06N 99/00* (2010.01)
*H04L 29/08* (2006.01)

(58) Field of Classification Search
CPC ............ G06F 21/6209; G06F 21/6218; G06Q 20/3827; H04W 24/02; H04W 4/003; H04M 15/58; H04M 15/61; H04M 15/70; H04M 2215/0188; Y10S 707/99943; Y10S 707/99953
See application file for complete search history.

(56) References Cited

U.S. PATENT DOCUMENTS

| | | | |
|---|---|---|---|
| 5,886,991 | A | 3/1999 | Guarneri et al. |
| 7,406,653 | B2 | 7/2008 | Ide et al. |
| 7,689,645 | B2 | 3/2010 | Thione et al. |
| 2002/0019869 | A1 | 2/2002 | Goldzmidt et al. |
| 2005/0188191 | A1 | 8/2005 | Yoshida et al. |
| 2007/0168548 | A1 | 7/2007 | Atogi et al. |
| 2007/0300239 | A1* | 12/2007 | Adam .................. G06F 9/505 719/320 |
| 2009/0270754 | A1 | 10/2009 | Moridaira |
| 2011/0191759 | A1 | 8/2011 | Andrade et al. |
| 2012/0239739 | A1* | 9/2012 | Manglik ............... G06F 9/5077 709/203 |
| 2012/0303618 | A1* | 11/2012 | Dutta .................. H04L 67/1097 707/737 |
| 2012/0303740 | A1* | 11/2012 | Ferris ............... G06F 17/30194 709/217 |
| 2012/0324114 | A1* | 12/2012 | Dutta .................. G06F 9/5066 709/226 |
| 2012/0331249 | A1* | 12/2012 | Benjamin ............ G06F 3/0607 711/162 |

FOREIGN PATENT DOCUMENTS

| | | |
|---|---|---|
| JP | 9-252275 A | 9/1997 |
| JP | 2005-234931 | 9/2005 |
| JP | 2006-048253 A | 2/2006 |
| JP | 2006-268848 A | 10/2006 |
| JP | 2007-193806 A | 8/2007 |
| JP | 2009-134590 A | 6/2009 |
| JP | 2009-265876 A | 11/2009 |
| JP | 2010-165265 A | 7/2010 |
| WO | WO 2012/005611 A1 | 1/2012 |

OTHER PUBLICATIONS

System and Apparatus for deploying workloads in Cloud based on Application Type and workloads relationships, Disclosed Anonymously, Retrieved from IP.com, May 13, 2011.*
Method for optimal allocation of resources in a cloud computing environment, Disclosed Anonymously, Retrieved from IP.com, Feb. 15, 2011.*
Profiling Applications for Virtual Machine Placement in Clouds, Do et al, IEEE 4th International Conference on Cloud Computing, pp. 661-667, 2011.*
Resource Calculations with Constraints, and Placement of Tenants and Instances for Multi-tenant SaaS Applications, Kwok et al., ICSOC 2008, LNCS 5364, pp. 633-648, 2008.*
A Hybrid Approach to Placement of Tenants for Service-based Multi-tenant SaaS Application, Yang et al., IEEE Asia-Pacific Services Computing Conference, pp. 124-130, 2011.*
Intelligent Database Placement in Cloud Environment, Yu et al., IEEE 19th International Conference on Web Services, pp. 544-551, 2012.*
Application Placement on a Cluster of Servers, Urgaonkar et al, 17th Intl. Conf. on Parallel and Distributed Computing Systems (PDCS'2004), 2004.*
Oliver Niehorster et al., "Autonomic Resource Management with Support Vector Machines," Grid Computing, IEEE, International Conference, pp. 157-164, XP032021774, Sep. 21, 2011.
International Search Report for PCT/EP2013/051563 dated Jul. 5, 2013.

* cited by examiner

| C,D | costs | Local Resource Graph |
|---|---|---|
| E,F,G,H | costs | |
| K.β.a | topology | Region |
| P.c | topology | Area |
| T.π.b | topology | Area |

METHOD FOR MAPPING MEDIA COMPONENTS EMPLOYING MACHINE LEARNING

The present document relates to cloud computing. In particular, the present document relates to methods and systems for cloud computing which enable the efficient and flexible placement of application components within a cloud.

The Internet is changing the way how users consume media. Enabled by Internet technologies, the evolution is quickly moving towards a point allowing users to enjoy media services like live 3D broadcasting, time-shifted viewing of live events or video on demand whenever wanted, wherever needed and on any preferred device. Even more, in the Internet, the user will not only be a spectator but an immersed participant. Web based services are the catalyst for a whole class of new personalized media centric applications, like massive sharing of multimedia content in real-time or immersive multimedia communication. These services will not be realized as a pure content stream, but as an orchestrated flow of media processing functions that will provide the requested data at the appropriate time, location and format. With the introduction of high definition video formats, the transferred data volume will outrun the size of the code building in the data transformation process. Therefore placing service components in an intelligent way on a distributed service infrastructure will provide a way to increase the scaling of the future Internet infrastructure. In other words, as the transferred data volumes increase, it may become more efficient to transfer and place SW components of a distributed application at appropriate positions within a cloud network.

The present document addresses the technical problem of providing a cloud of computing devices (also referred to as nodes) which enable the efficient and flexible placement of service/application components. In particular, the present document addresses the technical problem of providing an efficient scheme of placing application components within the cloud of computing devices.

O. Niehörster et al. "Autonomic Resource Management With Support Vector Machines", Grid Computing, $12^{th}$ IEEE/ACM International Conference on, IEEE 21.09.2011, pp. 157-164, describes a software solution that reduces the degree of human intervention to manage cloud services.

According to an aspect a computing device (also referred to as a computing node or node) adapted for distributed cloud computing is described. The computing device may be adapted to receive a plurality of component placement requests for one or more components of a corresponding plurality of applications. Furthermore, the computing device may be adapted to determine a plurality of feature vectors from the plurality of component placement requests, respectively. A feature vector of the plurality of feature vectors comprises vector dimensions which describe different attributes (or different aspects) of the respective component placement request. As such, the feature vector may be understood as a structured model of a corresponding component placement request.

In addition, the computing device may be adapted to determine a plurality of placement decisions regarding the plurality of component placement requests, respectively. A placement decision comprises an indication of one or more executing computing devices onto which the one or more components of the respective application have been placed. In particular, the computing device may be adapted to receive control messages from other computing devices and to determine the plurality of placement decisions (and possibly the feature vectors) based on the received control messages.

As such, the computing device may be adapted to gather training data comprising a plurality of feature vectors and a corresponding plurality of placement decisions. In particular, the computing device may be adapted to structure the information comprised in a component placement request and in a placement decision, thereby providing training data which can be used for machine learning, and thereby enabling an accelerated placement of future component placement requests.

In the context of machine learning, the computing device may be adapted to cluster the plurality of feature vectors, thereby yielding one or more clusters. The clustering may be performed using a machine learning algorithm, e.g. a support vector machine algorithm. Each cluster typically comprises a default feature vector describing the different attributes of a default component placement request. In other words, a cluster may be represented by a default feature vector, furthermore, the computing device may be adapted to determine a default placement decision for each of the one or more clusters. The one or more default feature vectors and the respective one or more default placement decisions may be stored in a database of the computing device. In particular, the one or more default feature vectors and the respective one or more default placement decisions may lie used for future placement decisions.

The computing device may be adapted to reduce the number of vector dimensions in the context of machine learning, i.e. the computing device may be adapted to reduce the dimension of the vector space, thereby reducing the overall complexity for handling future component placement requests. In particular, the computing device may be adapted to determine that a first vector dimension of the plurality of feature vectors has a correlation with the corresponding plurality of placement decisions which is smaller than a correlation threshold. In other words, the computing device may determine a first vector dimension which has little to no influence on the placement decisions. If such a first vector dimension is determined, the first vector dimension can be removed from the plurality of feature vectors.

The vector dimensions may be indicative of one or more of: a location of a sink and/or a source of data processed by an application component; a number of sinks and/or sources processed by an application: computing resources required by an application component (wherein the computing resources may be one or more of: processor resources, memory resources, bandwidth resources): connection attributes required by an application component (wherein the connection attributes may be one or more of: bandwidth, latency, maximum bit error rate); and/or a graph structure of the one or more components of an application (wherein the graph structure may indicate how the one or more components of the application are interlinked). The vector dimensions may have appropriate metrics in order to make them comparable with one another.

The computing device may be adapted to make use of the stored default feature vectors and the corresponding default placement decisions for handling a new component placement request. In particular, the computing device may be adapted to receive the new component placement request for the placement of one or more components of a new application. A new feature vector may be determined from the new component placement request (in a similar manner as is clone in the context of the above mentioned machine learning phase). The computing device may then determine where to place the one or more components of the new application based on the one or more default feature vectors stored at the computing device. In particular, the computing device may compare the new feature vector with the one or more default feature vectors, in order to determine if the new placement request can be handled in the same (or similar manner) as one of the one or more default placement decisions.

The computing device may be adapted to determine a minimum distance of the new feature vector from the one or more default feature vectors. The distance between the new feature vector and a default feature vector may be determined based on the respective metrics of the vector dimensions. By way of example, the distance may be determined based on a weighted difference of the respective vector dimensions of the new feature vector and the one of the one or more default feature vectors. If the minimum distance is below a minimum threshold, the computing device may determine where to place the one or more components of the new application based on the default placement decision corresponding to the default feature vector at the minimum distance from the new feature vector. In particular, the computing device may pass the component placement request to an executing computing device indicated within the default placement decision.

As outlined above, the present document relates to a media cloud comprising a plurality of computing devices. Furthermore, the present document relates to a distributed placement scheme, where each computing device is configured to take an individual decision regarding the placement of the one or more components of a new application. This placement decision may be taken based on default placement decisions derived from previous placement decisions (using machine learning). Alternatively or in addition, the computing device may be adapted to make use of topological and/or resource information available at the computing device, in order to make an individual placement decision.

The computing device may be positioned in a first topological area. Typically, the distributed cloud (referred herein as the media cloud) comprising a plurality of such computing devices is partitioned into a plurality of topological areas (which may be further subdivided into one or more regions). The computing device comprises a topological list indicating a plurality of reference computing devices positioned in a plurality of topological areas other than the first topological area, respectively. In other words, the computing device holds a topological list which provides an indication (e.g. a network identifier) of at least one reference computing device positioned within each of the oilier areas (or regions) of the distributed cloud. The topological list may comprise one or two reference computing devices per other area (or region). Typically, the reference computing devices are randomly selected from the available list of computing devices within a region, in order to ensure that each computing device has a different anchor point to the region, thereby removing single points of failure.

The computing device may further comprise a local resource list indicating available computing resources of the computing device and of at least one neighbor computing device positioned in a neighborhood of the computing device. The neighborhood of the computing device may be defined by one or more neighborhood conditions which need to be met by the at least one neighbor computing device. The one or more neighborhood conditions may comprise a maximum round trip time between the computing device and the al least one neighbor computing device. Alternatively or in addition, the one or more neighborhood conditions may comprise the condition that the at least one neighbor computing device is positioned within the first, i.e. within the same, topological area.

Upon determining that the minimum distance is greater than a minimum threshold (i.e. upon determining that the computing device cannot rely on previous placement decisions), the computing device may be adapted to determine, based (only) on the topological list, if the one or more components of the new application are to be placed in the first topological area or in one of the plurality of topological areas other than the first topological area. Typically, a new component placement request comprises information regarding the preferred location of a sink or a source of the component/application. By way of example, the information regarding the preferred location of a sink or a source of the one or more components may be derived from a description of the requirements of the one or more components and other components of the application that the one or more components are interworking with. The computing device may compare the preferred location with its own location and the location of the topological areas of the media cloud.

If it is determined that the one or more components are to be placed in one of the plurality of topological areas other than the first topological area, the computing device may be adapted to pass the component placement request to the reference computing device of the respective topological area of the plurality of topological areas other than the first topological area. In other words, if it is determined that another topological area is closer to the preferred location, the placement request is passed to the reference computing device (or to one of the reference computing devices) of the another topological area, wherein the reference computing device (i.e. the indication to the reference computing device) is taken from the topological list of the computing device. As such, the computing device may be adapted to perform a topology management task based on its topological list, without the need to consult another computing device or a higher level network management entity. In other words, the topology management task may be performed autonomously by the computing device.

If it is determined that the one or more components are to be placed in the first topological area, the computing device may be adapted to identify from the local resource list a selected computing device having the computing resources for executing the one or more components of the new application. In other words, if the computing device determines that the preferred location of the component lies within the first topological area (or within the region of the computing device), the computing device may perform a resource management task based on the resource information available within its local resource list, without the need to consult another computing device or a higher level network management entity. This means that the resource management task may be performed autonomously by the computing device.

It should be noted that the above mentioned handling of a new placement request based on a topological list and/or a local resource list may also be used, when a default placement decision has been identified and when the new placement request is passed to an executing computing device identified within the default placement decision. In particular, the executing computing device may make use of its topological list and/or its local resource list to further optimize the handling of the one or more components of the new application.

The computing device may be a default application server of a point-to-multipoint, a point-to-point or a multipoint-tomultipoint application. Such a default application server may be a default point of access in a cloud of a plurality of computing devices for setting up the point-to-multipoint, the point-to-point or the multipoint-to-multipoint application. Examples for such default application servers are e.g. a central video conference server in a particular topological area, a central broadcasting server in a particular topological area, and/or a central call handling server in a particular topological area.

According to another aspect, a method for determining a database of default placement decisions and/or a method for placing one or more components of a new application onto a computing device of a cloud of computing devices is described. The method comprises receiving a plurality of component placement requests for one or more components of a corresponding plurality of applications. The method proceeds in determining a plurality of feature vectors from the plurality of component placement requests, respectively; wherein each feature vector comprises vector dimensions which describe different attributes of the respective component placement request. Furthermore, the method proceeds in determining a plurality of placement decisions regarding the plurality of component placement requests, respectively; wherein each placement decision comprises an indication of one or more executing computing devices onto which the one or more components of the respective application have been placed. As such, the method comprises determining a set of training placement requests (represented by the plurality of feature vectors) and placement decisions for enabling machine learning. The method comprises clustering the plurality of feature vectors, thereby yielding one or more clusters; wherein each cluster comprises a default feature vector describing the different attributes of a default component placement request. In addition, a default placement decision is determined for each of the one or more clusters. The one or more default feature vectors and the respective one or more default placement decisions are stored in a database of the computing device. Hence a database of default placement decisions may be determined. Furthermore, the one or more default feature vectors and the respective one or more default placement decisions stored in the database may be used for placing the one or more components of the new application.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

The invention is explained below in an exemplary manner with reference to the accompanying drawings, wherein FIG. 1 shows an example arrangement of computing nodes within a cloud;

Figure 1:
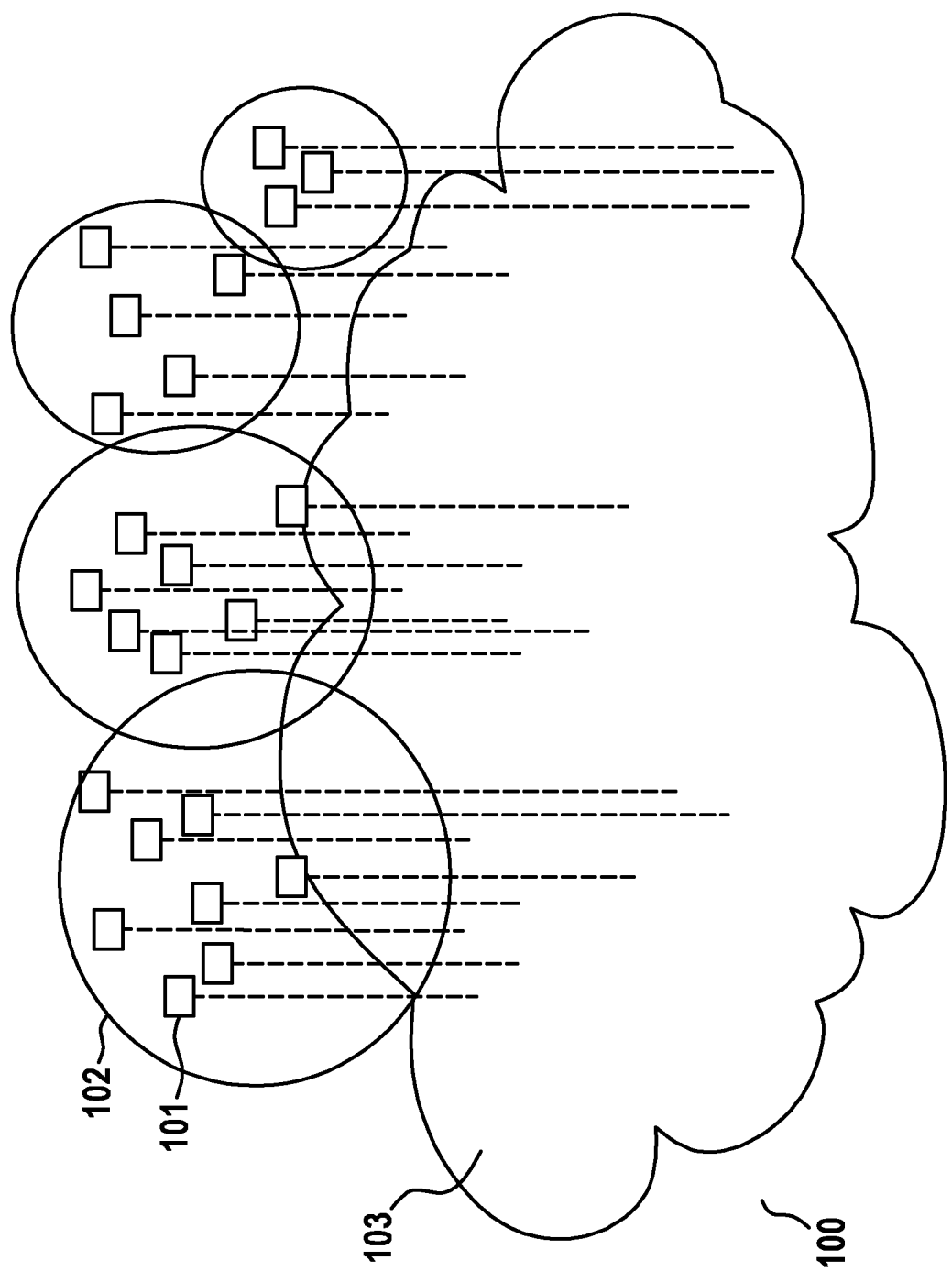

Up to today increased transport capacity demands in the networks are mainly achieved by enhancing installed bandwidth in the networks either by technological breakthroughs or the installation of new infrastructure elements. But there exist substantial concerns, that this evolution of networks subject to increased capacity demands cannot be expected to last, at least at reasonable costs. As future network enhancements become more and more challenging, there is a need for alternative approaches to meeting the increasing capacity demands. A well established approach to handling an increasing demand for network capacity is to add "higher layer" intelligence to the networks. The added "higher layer" intelligence aims to reduce the overall traffic, thus enhancing available transport capacity e.g. by localizing traffic. The first success of this concept of "higher layer" intelligence was the introduction of Content Delivery Networks (CDN). CDNs basically enable the massive scale adoption of (media) services comprising broadcast delivery characteristics in the Internet.

However, there is an emerging trend towards personalized media streams, where the media streams need to undergo processing somewhere in the Internet, i.e. in the cloud, thereby enabling the evolution of e.g. IP-TV towards personalized "multi-view" video service (see e.g. Ishfaq Ahmad. "Multi-View Video: Get Ready for Next-Generation Television." IEEE Distributed Systems Online, vol. 8, no 3, 2007, art. no. 0703-o3006) or enabling cloud based gaming services like "OnLive" (see e.g. OnLive, http://www.onlive.com/). While CDNs are built for the efficient delivery of the same content to a multitude of receivers, the new trend to individualized content streams which requires processing within the network is challenging the Internet infrastructure.

Today's applications and corresponding cloud infrastructures are typically designed in a way that data is moved through the network towards a dedicated location (i.e. a data center) where the application is executed. Preserving this cloud computing paradigm in the future Internet design would result in huge amounts of traffic which need to be transported to "arbitrary" data centers, where the processing functionality for media streams is located. It is proposed in the present document to change this paradigm of a centralized application processing at designated data centers. In particular, an intelligent infrastructure is proposed which forces the movement of applications or parts of the applications according to application requirements. Such schemes can offload unnecessary "long distance" traffic from the networks by localizing traffic and thus will help to overcome the issue of limited availability of transport capacity in future networks.

Even with today's cloud infrastructures, offloading of computing infrastructure into the Internet has become a commodity. Cloud computing providers, like Amazon EC2, Rackspace or Microsoft Azure, offer their infrastructure or platforms as a service, providing features like automated scalability and instant deployment, which supports the very dynamic needs of Internet based services like Facebook or Animoto.

However, today's approach has a significant cost: today's approach increases the overall load on the core networks because instead of keeping traffic local, more traffic is routed to centralized data centers (provided by the cloud computing providers). The centralized data centers process the data and send it back to the requestors. While this seems to be feasible for traditional request/response based web-services, this centralized approach might break the design of the actual Internet architecture for massive media centric real-time applications like personalised MultiView video rendering.

It is proposed that the Internet embeds intrinsic capabilities to directly support a service oriented computing paradigm that enables developers and end-users to execute their personalized applications onto an integrated network and computing infrastructure.

Autonomous services should be the components from which such applications can be built. The autonomous services should not be bound to a specific host infrastructure hardware addressed by their physical instantiation on that machine but should become moveable objects, which can be dynamically deployed on the distributed computing resources and collocated to the data-flows between the sources and sinks of the data flows.

The autonomous services may make use of well-defined abstraction models of the services, in order to enable the dynamic composition of services and the potential adaptation or relocation of services if workflow or context conditions change. A loose coupling of service components should enable the interconnection of the service workflow on demand and should facilitate adaptations of the workflow needed to provide the same relevant data to the user by modifying the service composition (given that services and their interfaces have some semantic service description).

From a user's perspective, a cloud typically behaves like a centralized server. Nevertheless, the cloud typically utilizes an aggregated or distributed set of free resources in a coherent manner. By monitoring the computational load and the network resources, it is possible to dynamically scale-up and scale-down instances and manage the network load without necessarily applying QoS (Quality of Service) management mechanisms on the data-paths.

Especially in media applications such components can be implemented as data transformation services, i.e. entities, which consume data in order to generate another data stream. In other words, media applications may be modelled as a sequence of data transformation services. As such, video cameras are data sources that generated video data. Video processing components, like video codecs, scaling or framing components may allow for the transformation of data in order to adapt the media stream to a suited format e.g. for mobile terminals or TV displays. Image recognition can identify objects out of the video signal, which can be merged from different sources to generate a 3D model of the scene.

Using such a data transformation model and the original video streams of the cameras, a new personalized view for a user can be rendered and sent to the display. Such a service can be represented by a directed graph, which will be instantiated upon deployment time. During the instantiation process, the required resources are selected from an available resource pool. As a result of selecting the required resources during the instantiation process, the overall traffic imposed by the service onto the network will be reduced. In other words, the resource selection process may be directed at reducing the overall traffic imposed by the service onto the network. The resource selection process may furthermore consider optimizing QoE (Quality of Experience) aspects for consumers of the service.

Applications with varying service characteristics can benefit to a different extend from the Media Cloud (MC) concept. Major benefits can be achieved on applications that require a consistent flow of continuous data over a certain period of time or on applications that require the transfer of large amounts of data for processing. On the other hand, for applications which require only a very limited transfer of data, the service transfer overhead and the instantiation cost may exceed the gained benefits. As a consequence, it may be beneficial within the MC concept, to provide mechanisms allowing the retrieval of "meta-information" associated with data. Such "meta-information" associated with data may provide information on where the data is located, on how much data needs to be transferred for service execution, if the data is a constant media (e.g. video) stream or only a limited amount of data (e.g. a data file) which needs to be transferred prior to service execution.

In order to support media cloud scenarios inherently by the network architecture, some basic principles from the existing Internet architecture should be reconsidered. First, well-known principles from content networking should be extended to support the MC approach described in the present document. Content networks explore locality of data, i.e. instead of serving a request for data at the source, a local cached copy of the data is delivered. A scheme may be proposed that directly addresses the content and uses this information for routing purposes, instead of using the location where the content was generated for routing decisions.

An extension of the above mentioned scheme would be to not only address the content, but to also address a service that is able to provide the requested data and instantiate a processing pipeline to do the necessary transformations. Instead of performing centralized processing for all users in a single domain, media flows may be combined or split at appropriate locations exploiting intrinsic "multi-cast" capabilities in the network layer where available. This is beneficial over existing schemes, where multi-cast has to be explicitly incorporated by the service developer not knowing if "multi-cast" is supported in the network and therefore can only be achieved by means of overlay mechanisms.

If the traffic patterns of (media) flows exchanged between different service components are accurately predicted, the MC-enabled network described herein can operate on such flow patterns directly, instead of executing routing decisions on a per packet basis. Thus the MC-enabled network can enable efficient flow-based switching by providing available meta-information of media streams, exchanged between service components to the network. This information can enable the control plane in such MC-enabled networks to increase the overall throughput.

The MC scheme may also consider that a flow based switching paradigm is typically achieved at the cost of supporting more dynamicity in flow control handlers. In order to "limit" such costs, MC-enabled networks should provide capabilities to aggregate multiple data streams which are sharing paths between service components executed in the same data centers. By introducing an aggregated granularity of joint streams between data centers, the control complexity in the core network itself can be limited.

A further requirement on the network when providing a MC is that flows should be handled in the network in such ways, that uninterrupted relocation of media flow endpoints, which are no longer machines but services (i.e. service components), is supported. In consequence, for MC-enabled networks client APIs like the socket interface may need to be modified. As MC-enabled services are built from self-contained components generally operating on input stream(s) of data to generate their output data, which is then distributed to the subsequent consumer components of this service, the use of dedicated sockets for communication purposes may no longer be sufficient and new paradigms may need to be considered in the context of a future Internet.

Typically, the processing resources of a usual cloud application have to be assigned prior to service runtime. Most often this mapping is a manual administrative task of deciding which data centre should host a specific application. As a consequence, regardless the location of origin of data to be processed, the data to be processed typically has to be sent towards its pre-assigned data centre, be processed there and sent out to its destination. Such a static placement scheme is not sufficient to exploit the benefits of distributed media application deployments, which improve service performance and resource utilization by dynamically adapting service execution at runtime. For example, a global video conferencing service may be enabled to grow and shrink, or move to mote appropriate locations following the usage pattern of the users of the video conferencing service. This adaption of resources may be achieved by creating, by taking down or by moving application components of the video conferencing service within the MC. The present document is directed at efficiently providing such placement and re-placement decisions for application components, while avoiding complex service logic (middleware) taking care about service scaling and component locality.

For truly distributed service deployments, which operate at least on the granularity of per-user components, educated component placement decisions can typically only be achieved during service runtime. Only at that time data sources and data sinks of relevant media streams are known and thus media processing components can be assigned to close-by processing resource locations, thereby resulting in reduced end-to-end service latency and in offloaded networks by keeping the traffic local. Changing service profiles and varying traffic patterns might even require resource re-assignment for components during service runtime. Thus efficient component placement typically requires not only a one-shot mapping decision when an application component is instantiated, but typically also requires the continuous evaluation of resource assignments.

The Media Cloud described herein typically uses lightweight application components (i.e. application components having a relatively small data size) and provides a distributed orchestration middleware following a flow-based programming model adapted to effective media processing. Due to the small size of the application component, the components are flexibly deployable during execution time and can be placed at a location where the application component runs most effectively to provide highest user experience at lowest cost.

Application components may separate the inner functional logic from the external application logic. Typically, application components are triggered by the arrival of a new instance of streamed media e.g. by the arrival of a video frame. In response, messages are delivered towards an appropriate application component via determined connectors—which are referred to as "ports" in the Media Cloud—that connect the application component to the execution environment. When a new video frame is received the application component operates on it, e.g. converts the received frame from a Red-Green-Blue (RGB) colour space to a gray-scale image, merges frames from two input streams into a single output image, or performs face detection.

Whenever the application component has concluded its operation and has generated results, it invokes the execution environment to transfer the processed data to potential consumers of the data generated by the application component. The execution environment identifies and resolves consumers of the generated output and handles the data transport. This handling by the execution environment hides external bindings from the application component and allows dynamic binding and reconfiguration of the overall application even at execution time. In order to assure that the sender and receiver are interpreting a message in a consistent way, different port types may be considered.

Within the MC context described in the present document, the overall application logic is established by control components which create or dismiss application components and which construct or release connections between the application components. Although control components typically do not participate in the media path, the control components are connected to their child components through a special control port, in order to provide configuration parameters, send control commands to the child components or to receive error messages.

Typically, a new application component is instantiated at the same local resource where the corresponding control component resides. After the connections to other application components in the media flow are established, the execution environment invokes a mapping process as outlined above and transfers the application component and the state of the application component to a resource that is better suited to host the application component for performance, latency or other reasons.

The flexibility of the application component-based approach allows extending applications by on-demand addition of further application components e.g. by a face detection functionality in order to identify the presence of a known person instead of an arbitrary moving object.

In the context of the application component placement process various technical problems are e.g.: The realization of efficient resource assignment strategies and management schemes that provide sufficient performance and scale even in the case of highly distributed resource deployments algorithms, the identification of reasonable limits of fine-grained service deployments (i.e. the identification of an optimum granularity of the application components), the design of appropriate assignment algorithms and strategies, and the feasibility of a fully distributed assignment approach. The present document addresses these technical problems. In particular, the present document describes a method for placing application components within the MC.

A possible solution to a fully distributed assignment approach could be to not assign an application component in a single computational step to a computational resource based on 'global' knowledge, but to forward a component from resource to resource based on local knowledge at the resource until the currently best fitting resource is reached. This approach is comparable to the forwarding approach for IP packets in IP networks. In such a forwarding approach the topology and demand information may be limited to neighbourhoods, or circles of small radius around selected facilities, whereas demand information is captured implicitly for the remaining (remote) clients outside these neighbourhoods, by mapping the components to clients on the edge of the neighborhood. The circle radius may be used to regulate the trade-off between scalability and performance.

A further approach may be the use of distributed mapping nodes for replica selection. An algorithm may be used which maintains a weighted split of requests to a customer's replicas, while preserving client-replica locality to the greatest possible extent. Such an approach solves an optimization problem that jointly considers client performance and server load.

The above mentioned approaches typically do not memorise the current distributed system state together with the distributed service requests. As a consequence each minor change of the system state or the request rate may lead to the necessity to solving an optimisation problem which requires time and processing effort and/or to a multi-step application component re-placement process which is slow and may involve local minima. Furthermore, the above mentioned approaches do not provide capabilities for the identification of recurrent and synchronized service attacks.

FIG. 1 illustrates a set 100 of computing nodes (also referred to as computing devices) 101. These computing nodes 101 form a flat arrangement without hierarchy, i.e. none of the computing nodes 101 of the set 100 has an overall control or management functionality. Each of the computing nodes 101 works independently from the other computing nodes 101 and solely relies on the individual information of the structure of the set 100 available at the computing node 101. The set 100 is referred to as a media cloud (MC) 100 in the present document. The different nodes 101 are interconnected via a communication network 103 such as the Internet.

It is proposed to use a distributed arrangement 100 of cloud computing appliances 101, in order to provide services or applications in a distributed manner (as opposed to a centralized manner). As a result of a distributed provisioning of services or applications, it is expected that the services or applications can be provided in a more resource efficient manner (notably with regards to the required transmission resources of the communication network 103). In this context, a fully distributed resource management (RM) system for the cloud computing appliances 101 is described, whereby none of the RM functions provided on the cloud computing appliances 101 has full knowledge with respect of the available resources and of the topology of the arrangement 100. Overall, it is desirable to provide an autonomous, distributed and autarkic resource management (RM) function of each of the nodes 101 of the MC 100.

In this context, an "autonomous" RM function means that each node 101 decides autonomously about its local resource neighbors, in order to decide where to have an application or a component of an application executed, furthermore, an "autonomous" RM function decides autonomously on the representative of another cloud resource region. In other words, the MC 100 may be subdivided into a plurality of cloud areas 102, and each of the nodes 101 of a first area 102 may autonomously select a node 101 of a second area which is representative of the entire second area 102 (or a sub-region of the second area 102). As such, each node 101 may autonomously build up a local resource graph of the resources which are available in the neighborhood of the node 101 within the area 102 of the node. Furthermore, each node 101 may build up a topological list of representative nodes of the other area 102 of the MC 100, thereby providing each node 101 with a point of entry into all the area 102 (and possibly all of the sub-regions) of the MC 100.

The RM function of each node 101 is "distributed" in that a resource management function is placed on every node 101. In an embodiment, none of the nodes 101 has any particular special role (e.g. a coordination role). Each node 101 performs its RM function in an "autarkic" manner, meaning that a decision on where to place a software component within the MC 100 is solely performed by the node's RM function (without consulting a higher layer control function). In order to work in an "autarkic" manner, each node 101 holds an individual view of near/local resources (e.g. via a local resource graph) and an individual linkage to other areas and/or (sub)regions (e.g. via the topological list).

The nodes 101 of the MC 100 do not share a common overall network map of the position of all the nodes 101 within the MC 100. Instead, each node 101 comprises an individual network map which reflects the node's view of the entire MC 100. The individual network map may comprise the local resource graph (thereby indicating some of the neighboring nodes within the same area or region 102) and the topological list (thereby providing at least one representative node of each area 102 (or region) of the MC 100).

Figures 2, 3:
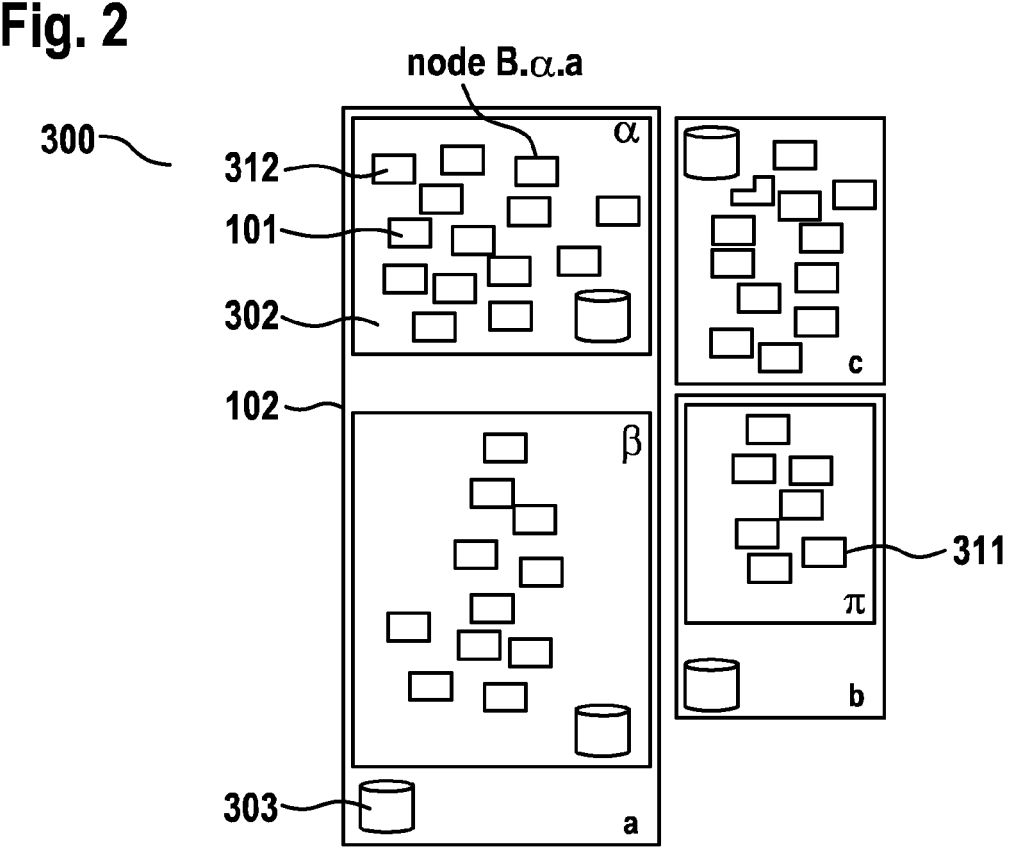
FIG. 2 illustrates an example representation of the regional grouping of a plurality of computing nodes.
FIG. 3 illustrates an example resource and topology graph of a computing node.

FIG. 2 illustrates a topological clustering 300 of nodes 101. As indicated above, the topology of the MC 100 can be ordered into hierarchy levels (e.g. of areas 102 which comprise one or more regions 302). As such, a node 101 (e.g. the node B of FIG. 3) may be attributed to a region 302 (e.g. the region α) which itself is attributed to an area 102 (e.g. the area a).

A particular node 101 only has a limited view of the entire MC 100. This limited view of the MC 100 is used by the node 101 to perform an "autonomous" RM function. This part of the RM function may be referred to as the topology management performed by the node 101. In order to be able to reach each area 102 (or region 302) of the MC 100, each node 101 adds one (maybe several) representative of another area 102 (or region 302) into its topology tree or topology list (also referred to as topological list). If the nodes of the MC 100 are organized in one hierarchy level e.g. in areas 102 (without any subdivision into regions 302) then each root node 101 should store an (arbitrary) representative of any other area 102. If the nodes 101 are organized into two hierarchy levels e.g. regions 302 and areas 102 (each area 102 holding one or more regions 302) then each root node 101 should store an (arbitrary) representative of any other area 102 and an (arbitrary) representative of any of the regions 302 in this area 102.

As such, each node 101 puts itself into the root position of its local resource graph (RG) which provides the node 101 with the ability to perform resource management within an area 102 (or within a region 302). Furthermore, each node 101 puts itself into the root position of its topology graph (or topology list). This provides the node 101 with its individual view of the network. Each (root) node 101 adds one or more representatives of other regions 302 (and/or areas 102) into its topology graph (TG). It should be noted that any node within a region 302 can be a representative of this region 302. i.e. all nodes are equal and none of the nodes of an area 102 or region 302 has special tasks. In case of a two hierarchical topology (comprising areas 102 and regions 302), a maximum of two steps are required to address the correct region 302 from each of the nodes 101 using the TG of the node 101.

The local and regional topological information may be stored within a table 600 as shown in FIG. 3. The table 600 indicates the nodes of the local resource graph 601 including the costs 611 associated with the respective nodes of the local resource graph 601. The costs 611 of another node may comprise resource values attached to the other node, e.g. available processing resources, available link bandwidth, available memory resources, achievable round trip time, etc. Furthermore, the table 600 provides a topology list 602 indicating the representative nodes of other regions and/or areas. The topology information entries may also hold multiple alternatives (instead of a single entry per region/area). As such, the memory table 600 is a representation of the nodes viewpoint of the MC 100. The number of nodes within the local resource list 601 is typically limited to a predetermined number which is smaller than the total number of nodes within an area/region. The number of nodes per area/region within the topology list 602 is limited to a number of nodes (e.g. one or two nodes) which is smaller than the total number of nodes within an area/region. This means that each node 101 only has a restricted view of the complete MC 100.

A node 101 manages the resources and topology in a table 600. The resource entries 611 store the cost tuple information received from the neighboring nodes. Depending on the distance (d) from the root element, the precision of the cost tuple values can vary with respect of accuracy, actuality, aggregated view, etc. The cost tuples may contain resource values such as processing, memory, link bandwidth, RTT (round trip time), etc. In case of a component instantiation process (i.e. a component placement process), the node first analyzes its own resource state and then compares it with the nodes in the RG 601. The node decides whether it instantiates the component locally or forwards the request to a neighbor node within the RG 601.

The local resource graph 601 may be used for the resource management performed by a node 101. As indicated above, each node performs an independent resource management function based on the limited information available at the node 101, in particular based on the local resource graph 601. The local resource graph 601 is based on a subset of nodes (which is typically taken from the same region). It should be noted that, for nodes 101 which are positioned near the border between a plurality of regions 302, the neighboring nodes within the local resource graph 601 may comprise nodes of other regions. Typically, the local resource graph (RG) tree depth is limited (to the near network neighbors, or to the vicinity). In a booting process of the node 101, the positions within the local resource graph may be negotiated from a given set of (regional) nodes. In other words, the node 101 may select an appropriate subset of available nodes to be placed within the local resource graph. A continuous (slow) optimization process allows to replace nodes by other nodes in the same region. This means, if a root node 101 observes that a node within its local resource node does not contribute (significantly) to the resource management function of the node 101, the root node 101 may decide to replace the non contributing node by another node from the neighborhood of the root node 101.

As indicated above, each node 101 in the local RG is attributed with a cost scalar/tuple 611. This tuple 611 helps to decide where a new component instantiation request has to be placed. In other words, when deciding where to place the execution of the component of an application within the MC 100, the node 101 may consult the local RG 601 and place the component with one of the nodes comprised within the local RG 601, based on the costs 611 provided by the node. The nodes in the local RG 601 inform their RG root node 101 regularly about the current resource state. In other words, the nodes of the local RG 601 push information regarding their resources to the root node 101, thereby ensuring that the root node 101 can make substantiated resource management decisions. In particular, the local RG information (e.g. the cost 611) is used to identify one of the nodes within the local RG (incl. the root node itself) as an appropriate node for component placement. It should be noted that the placement process of a component can take several iterations. On the other hand, there is no central or partial central functionality for performing the resource management function, thereby removing the risk of a single point of failure.

As such, each node 101 has a limited network view which comprises the local resource graph 601 and the topological graph 602 indicating one or more representative nodes of the other regions. As indicated above, the topology of the MC 100 may be determined in a distributed manner using the Vivaldi and Meridian algorithms. At an initialization stage, each node 101 may be able to access the complete list of nodes within the same region/area. The node 101 uses this list of nodes to build the local resource graph 601. Furthermore, at the initialization stage, each node 101 may select at least one node from the remaining regions/areas. The selection of the at least one node of the remaining regions/areas should be performed in a random manner, in order to ensure that the nodes of a region have different representative nodes of the other regions, thereby preventing single point of failures or loopholes.

Figure 4:
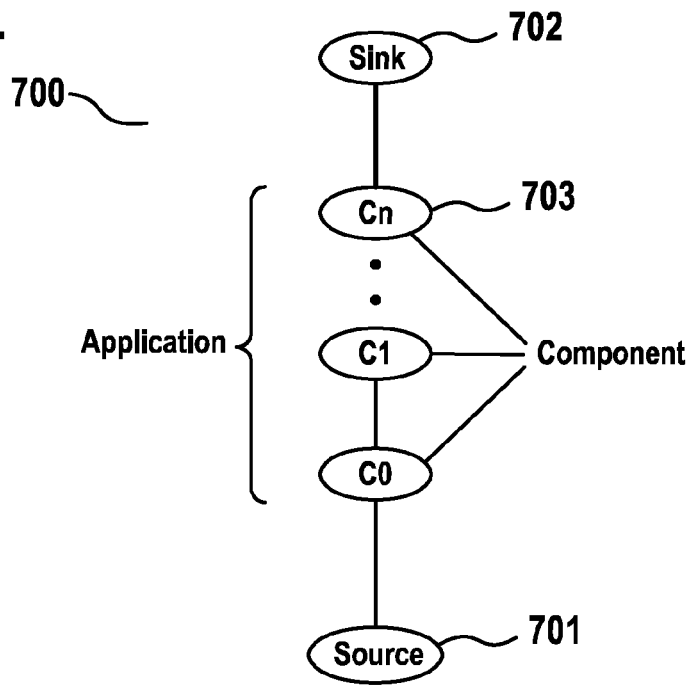
FIG. 4 illustrates example components of an application.

In the following, further details regarding the mapping function 401 provided by a node 101 are described. Based on the topology and resource information available at the nodes (i.e. the information 600), the nodes of the MC 100 may determine on the (optimum) placement of software (media) components on the nodes 101 of a Media Cloud system 100. As shown in FIG. 4, an application 700 is typically composed of a plurality of components 703. By way of example, a conference call application comprises a plurality of audio codec (coding/decoding) components (one for each participant of the conference call), as well as a mixer component (for connecting the voice channels of the participants). Typically, an application 700 (and the components 703) has a source 701 (from which data is provided) and a sink 702 (to which data is provided). In the above mentioned examples, the individual participants of the conference call application may be considered to be sources and sinks. The task of the component placement process is to place the components 703 of the application 700 at appropriate locations within the MC 100, in order to reduce the consumption of resources of the communication network 103. By way of example, by placing the audio codec component of a conference call application within the proximity of the respective participants, the transmission bandwidth required by the application can be reduced (as only encoded voice traffic is transmitted through the communication network 103). Furthermore, the mixer component of the conference call application should be placed at a central location between the participants of the conference call.

In FIG. 4, the different widths of the links between the different components 703 and between the source 701 and the sink 702 indicate different requirements regarding the links (rubber band model). Bands between components 703, which indicate a higher spring constant, indicate that the components 703 should be placed in proximity with respect to one another (e.g. on the same node)

The placement procedure should take into account the available node resource and the available link resources. Furthermore, the requirements of the application components 703 (e.g. with regards to processor resources, memory resources, link bandwidth, delay, jitter) should be taken into account.

Such placement decisions could be performed in a centralized manner. However, central or meshed solutions for component placement typically do not scale in large systems. Furthermore, such central solutions tend to provide single points of failure.

In the present document, a distributed placement scheme using the limited information available at the nodes 101 of the media cloud 100 is described. The distributed placement scheme makes use of individual mapping functions 401 performed by the individual nodes 101. These mapping functions are separated into two sub-tasks: Topology management and Resource management. Topology management makes use of the topology information available at each of the nodes 101 (in particular, the topology list 602). A component placement request is typically accompanied with regional information about the sink or source of the application (or the component). The node checks (his topology information and forwards the request to the representative of the region (or area), if the topology info does not match with his own. In other words, the node verifies if the desired sink or source location of the component is in line with the region of the node. If not, the component placement request is passed to the representative node of the appropriate area or region, which is known to the node (from the topology list 602). In a two hierarchical topology (regions and areas), maximum two steps are required to address the correct region 302. In case of a placement request for multiple components, the topology process needs only to be performed once. In other words, a list of related components (which belong to the same service or application) can be placed in a single step.

Resource management is directed at the local resource placement depending on the load status of the different nodes of the MC 100. If the node receives a component placement request and indentifies that the component should be placed within its region, then the node consults its local resource graph 601 to identity a node within the graph 601 which has the necessary resources to execute the component. Typically, the different nodes 101 of a network already have cached copies of the component which is to be placed. As such, it is typically only necessary to initiate the instantiation of the component on the identified node. Otherwise, the identified node may download the component from a central component database.

In an example, the node 311 (source) of FIG. 2 requests the setup of an application which has a sink involving the node 312 (sink). The question is how the node 311 can find a node which is in the proximity of the sink (or vice versa). As indicated above, the mapping function (MF) 401 in each node 101 of the MC 100 stores its own and the neighbor's resource occupations and topology information, so that each node can draw its placement decision in an autarkic way. Firstly, the available topological information is used to find a network region which is near to either the sink or source. Secondly, the local resource information of neighboring nodes in the selected region is used, so that a node can decide where to place the new component within its neighborhood. Using the above mentioned placement scheme, none of the nodes need to know the full and precise resource and topology information of the MC 100. Nevertheless, the achieved placement is almost perfect. It should be noted that in the placement scheme outlined in the present document, none of the MC nodes 101 has an extraordinary role during the online processing. As a consequence, one or several of arbitrary MC nodes 101 may fail without causing a system breakdown.

A node's mapping decision process may involve the following steps. In a first step it may be checked whether the sink (requested within the component placement request) is in the same area/region as the node. If this is not the case, then the node searches in its table 602 for a representative node in an area/region which should match the requested sink. The node forwards the component placement request to the representative node. The representative node validates that the sink is in its area and region otherwise it would have to forward the request to its individual representative from the destination region. The representative node checks its local RG 601 for the best suited MC node which is near and which has the best cost value to execute the component. It should be noted that as an application typically consists of multiple components whereby the interconnection between these components has various requirements. The placement decision can be improved if the whole or larger parts of the application graph information can be provided for a more holistic mapping decision.

As indicated above, each node 101 comprises a local resource graph 601. When receiving a component placement request, the node 101 searches for an appropriate node within its local resource graph 601 and forwards the component placement request to this node. This node also comprises a local resource graph 601 and searches for an appropriate node within its local resource graph 601 to handle the component placement request. In order to ensure a convergence of this iterative process, the forwarding of a component placement request may be submitted to a condition regarding a minimum required improvement. In particular, it may be specified that a component placement request can only be forwarded to a node within the local resource graph 601, if this leads to a minimum required improvement for the component placement (e.g. a 20% reduction of processor capacity/bandwidth, etc.).

As such, the plurality of nodes 101 of a MC 100 is enabled to perform a distributed placement of application components within a network, without the involvement of a centralized placement server. The plurality of nodes 101 rely on the exchange of component placement messages (e.g. component placement requests and/or messages regarding information about the available computing resources in one or more neighboring computing device). In the following, a method for accelerating the distributed placement scheme based on machine self-learning is described.

As has been outlined above, deployment algorithms (as part of the distributed placement scheme) calculate the locations of Virtual Machines (VM), applications or application components on the nodes 101 of a distributed Media/Cloud Computing system 100, so that the placement of the service software (VM, applications, components) is optimized with respect to resource usage (CPU, memory, bandwidth, . . . ) and service quality experienced by a user. By way of example, a video conferencing application is considered. If most of the participants of the conference are located in the US, then the mixer application component 703 should preferably be located in the US. In another case of evenly distributed (location) participants of the conference, the location of the common mixer application component 703 should be determined so that the network resource allocation is minimal.

Overall, a high number of applications (and corresponding application components) are placed within the MC 100. The results of the distributed placement processes may be used to extract placement knowledge which can be used for the placement of future application placement requests. In particular, a classifier could distinguish between different service access situations (conferencing applications, broadcasting applications, etc), by identifying the ingress ports of the Media Cloud 100 where a particular service (application) was accessed from. If the (distributed) placement algorithm has found an (almost) optimal placement for a particular service access situation, the placement decision can be remembered together with the concrete service access situation. Consequently, the next time, when the classifier identifies an access situation which is similar to the stored access situation, the remembered placement location can be used and setup. As such, future placement decisions can be accelerated by relying on previous placement decisions.

Typically, there is a huge amount of diverse services (applications) 700 used in parallel on the MC 100. Each of these services 700 can be used by a different amount of clients reaching the service 700 and the MC 100 via different ingress ports. Typically, minor variations in an access situation (e.g. a scenario where n conference charts are located in the US, compared to a scenario where (n−1) conference clients are located in the US and 1 is located from Germany) result in an unchanged optimal placement of the software components 703. A machine learning-based classification can be applied to identify which access situation can be served optimal using the same placement decision. Machine learning based classification also allows for the definition/learning of local hyperspheres (around a particular access situation) which define a so called (ε)-room of similar access situations which can be served using the same placement decision. The local hypersphere may be assigned with a database entry storing the optimum component/software placement known so far. The assignment of the hypersphere with a database entry comprising an optimum component placement is part of the online learning procedure. After the MC resource management has set up the placement according to the database entry, a further improvement of the component placement may be achieved by applying distributed mapping algorithms (as outlined above). If an improved placement situation can be determined, the database entry comprising the suggested component placement would be overwritten with the improved placement, thereby providing for a continuous online learning process.

The online learning process could result in a classifier (used for classifying access situations) separating one local hypersphere into several different local hyperspheres. This can happen, if a unique (former) best placement solution for an access situations classified by a single hypersphere disjoins into different placement solutions with individual hyperspheres.

Classification can be performed separately per service type, or with a single classifier for all services running on the Media/Cloud system 100. A service (or application) type may be defined based on the type of access situation (e.g. many-to-many (as is the case for a video conference), one-to-many (as is the case for broadcasting), point-to-point (as is the case in point-to-point communications). Alternatively or in addition, the service type may be defined based on regional considerations (continent, country, city). Alternatively or in addition, the service type may be defined based on the actual service rendered (e.g. conferencing, broadcasting, etc.). In case of a single classifier for all services, the interaction between competing services may also be taken into account. As a consequence, the number of local hyperspheres may increase significantly.

In addition to the service access situation, the resource allocation situation of (servers and links) can be used as additional inputs to the classifier. By way of example, the machine learning (ML) classifier could take into account service access situations from different clients;
types of offered (cloud) services and their access situation;
the ingress and egress cloud ports from which the services is accessed;
the nodes 101 and network resource allocations, whereby different characterisation tuples could be foreseen per resource:

During a learning phase, the ML classifier builds a plurality of hyperspheres which comprise equal or similar placement situations. Furthermore, the ML classifier determines the individual resource deployment decisions for the plurality of hyperspheres.

Hence, in order to enable an optimum and efficient application component placement decision, a machine self-learning system may be used. The ML system operates in two different phases: the learning phase and the execution phase. The ML system may be executed on an individual node 101 of the MC 100.

During the learning phase, the ML system (e.g. running on a particular node 101) analyses the Media Cloud control traffic messages (e.g. the placement requests and the messages regarding the resources, and messages regarding placement decisions), in order to derive a feature vector which describes a particular placement situation. The feature vector typically has various dimensions describing the placement situation, such as a type of application graph (star type graph of application components, linear graph of application components), the geographic distribution of the application components, attributes of the connections between the application components (e.g. bandwidth, latency, etc.). The feature vectors may be embedding into a feature space formed by the different dimensions of the feature vectors. The feature vector of a particular application placement request is stored along with a certain component mapping and the corresponding placement details in a feature vector database. During the learning phase, the system learns to distinguish between feature vector dimensions and properties which are important for the classification of component placements, and feature vector dimensions and properties which are obsolete and can therefore be omitted. This reduction of feature space dimensions increases the efficiency of the learning process and the quality of the media cloud classification results.

As a result of the learning phase, a geometric embedding reflecting the classification of media cloud application access situations into clusters (e.g. content distribution network (CDN)-like, Videoconference-like etc.) is obtained. In other words, the learning phase provides a plurality of clusters for typical application access situations (identified via their feature vectors), along with placement decisions.

During the execution phase, the mapping results which were obtained for already known Media Cloud applications during the learning phase are exploited to propose an application component mapping for a new and/or unknown media cloud application placement request.

For this purpose, the feature vector for a new application placement request is extracted from the application placement request employing the same scheme as used for the learning phase. In particular, the control messages may be analysed in order to determine the feature vector of the application placement request. The feature vector extracted for the new application placement request is then embedded into the media cloud feature space.

Then, by geometrical consideration, the closest representation of a previously learned media cloud placement in the feature space and the corresponding application classification is obtained. As a consequence, it is possible to recall the corresponding placement details for this feature vector from the trained MC placement database which has been filled with application mapping information during the machine learning phase.

As a result, a re-placement proposal for the Media Cloud mapping is obtained based on prior Media Cloud application mapping experience from the machine learning process in a fast and efficient manner. Consequently, application placement requests can be directed to appropriate MC nodes 101 in a fast and efficient manner.

The identification of a feature vector describing an application placement situation by geometrical considerations is possible e.g. by defining a suitable metric in the feature space and by calculating the distance between the different feature vectors under consideration of the metric. This metric may make use of different weights for the different vector dimensions, thereby emphasising different dimensions during the learning and execution phase.

Media Cloud feature vectors may comprise the following example information characterising the application and its mapping to the Media Cloud infrastructure:
the relation within the application graph (e.g. star like graph, linear graph);
the allocation of application components to resources;
application component resource consumption;
geo-location of the application components;
the ingress/egress points (devices) of the clients (sinks 702, sources 701); and/or
connection attributes (bandwidth, latency, loss rate, ... ).

Figure 5:
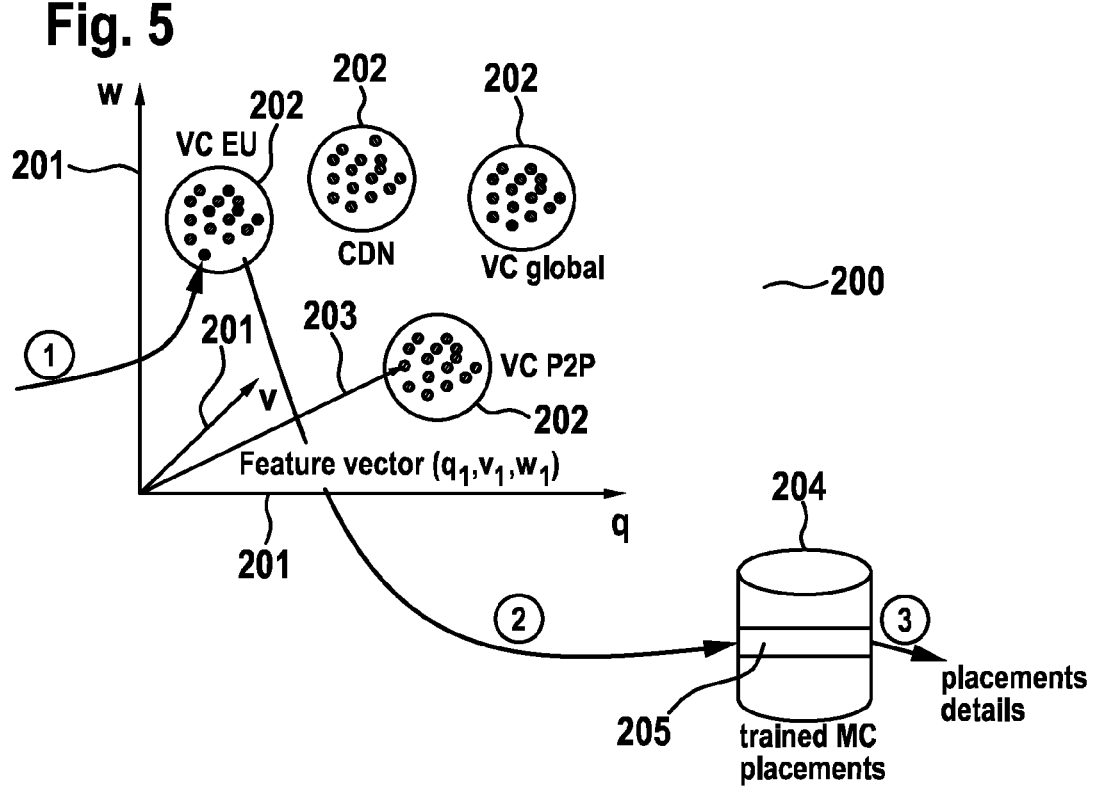
FIG. 5 shows an example vector space describing an application placement situation.

FIG. 5 illustrates an example vector space 200 of possible application placement situations. A particular application placement situation is typically linked to a particular application placement request. The example vector space 200 comprises three vector dimensions 201 $q, v, w$, wherein each vector dimension represents a corresponding attribute of possible application placement situations. As indicated above, example attributes (or vector dimensions) may relate to the application graph (i.e. the relative arrangement of the application components 703, e.g. in a star like arrangement or in a linear arrangement), the resource consumption of the different application components 701, the location of the sinks 702/sources 701 for an application 700, etc. Hence, a point (or feature vector) 203 in the vector space 200 describes a particular application placement situation (via the values of the different dimensions of the feature vector).

In order to represent an application placement situation in the vector space 200, the values of an attribute (or vector dimension) 201 may be associated with a numeric value which can be represented in the vector space 200. By way of example, the geo-locations of the different sinks 702/sources 701 for an application 700 may correspond to two vector dimensions 201 (one for the latitude angle and another one for the longitude angle). It should be noted that a typical vector space 200 may have hundreds of dimensions 201.

During the learning phase various placement requests are handled in a distributed manner by the MC 100. A node 101 involved in a placement request can observe the messages which are exchanged between the nodes 101 regarding a particular placement request. As a consequence, the node 101 can extract information regarding the placement request from the messages, thereby populating a feature vector 203 which describes the particular application placement request. Furthermore, the node 101 learns from the exchanged messages the final placement details 205 (i.e. the information where within the MC 100 the application components have been placed). The feature vector 203 and the corresponding placement details 205 can be stored in a database 204 of the node 101.

As a result, the node 101 gathers a plurality of feature vectors 203 and corresponding placement details 205 which can be used as training data for machine learning. In particular, a classifier can be used in order to determine a plurality of clusters 202 of feature vectors 203, wherein the feature vectors 203 within a cluster 202 have a relatively low distance in the feature space 200. In other words, the placement situations of a cluster 202 are similar to each other. In the illustrated example, the classifier has determined a different cluster 202 for Video Conferencing (VC) application requests with participants from the EU, a different cluster 202 for VC application requests with participants distributed across the worlds, a different cluster 202 for VC application requests with two participants, and a different cluster 202 for content distribution network (CDN) application requests, such as viewpoint rendering of a broadcasted TV stream. The classifier is configured to determine average and/or representative placement details 205 for each cluster 202. These average and/or representative placement details 205 can be used by the node 101, in order to accelerate the placement of a new placement request. In particular, the node 101 may determine a feature vector 203 of a new placement request. Furthermore, the node 101 may determine if the feature vector 203 falls within (or is close to) a cluster 202 and then use the average and/or representative placement details 205 of the cluster 202, in order to handle the placement request.

Figure 6:
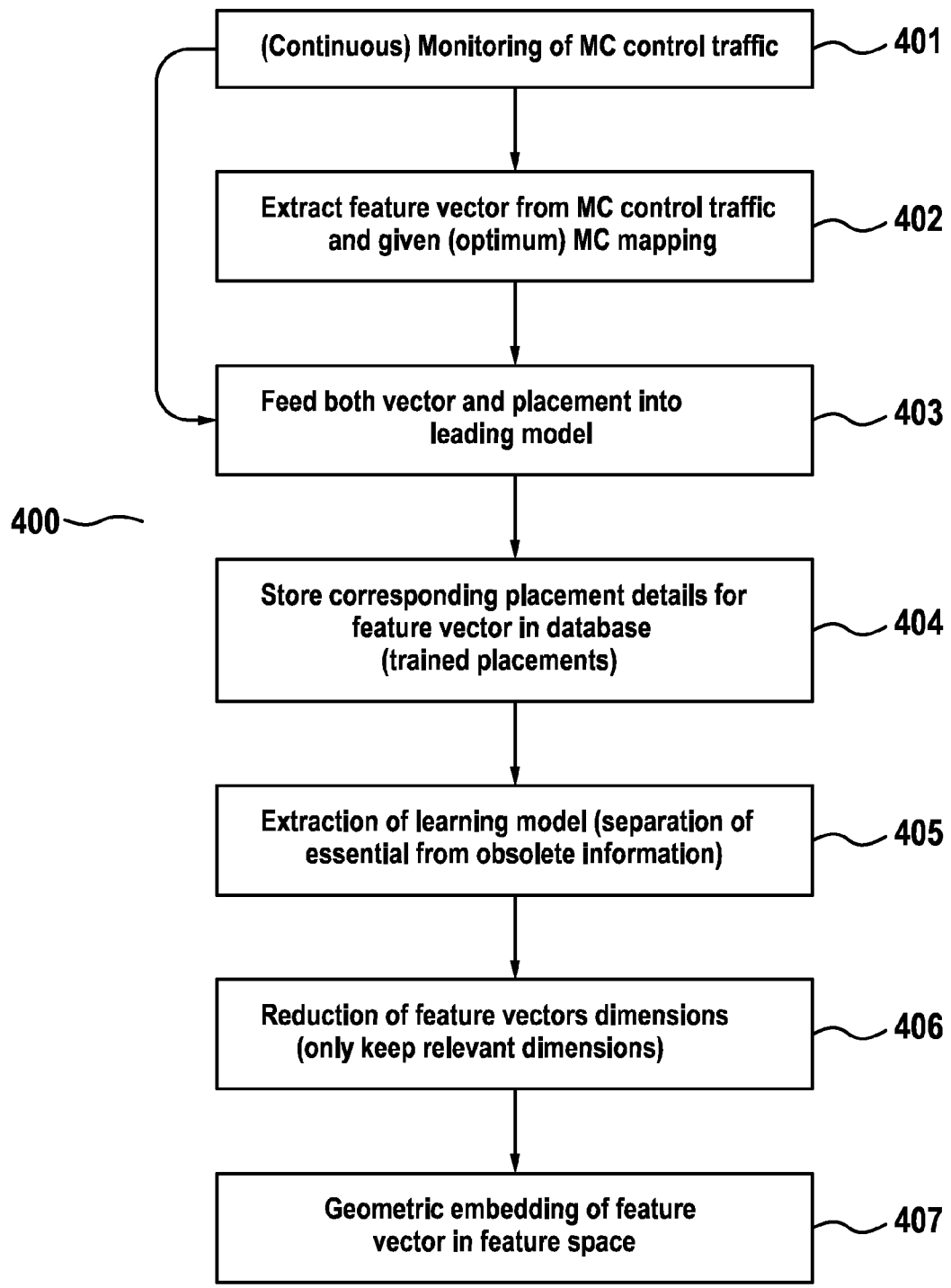
FIG. 6 shows a flow chart of an example learning method for application placement.

FIG. 6 shows a flow chart of an example learning method 400. The node 101 monitors the MC control traffic (step 401) in order to populate the feature vectors of a plurality of application placement requests. Furthermore, the mappings (i.e. the placement details) regarding the application placement requests are extracted from the control messages (step 402) and stored in a database (step 404). The extracted feature vectors and corresponding mappings are used as training data of a learning model (step 403). An example learning model makes use of the support vector machine (SVM) scheme. The learning model may apply a classifier for clustering the plurality of application placement requests. As a result of such clustering, it may be observed that certain dimensions of a feature vector 203 may be important for placement purposes, while other dimensions of a feature vector 203 may have no or little impact on a placement decision (step 406). The latter dimensions may be removed from the feature vector 203, thereby reducing the computational complexity of the machine learning scheme and of the placement process (step 406). Finally, representative feature vectors 203 of the clusters 202 may be embedded into the feature space 200 (step 407). A representative feature vector 203 may define a hypershere within the feature space 200, wherein the hypersphere comprises placement situations which are similar to the placement situation described by the representative feature vector 203, and which could be handled according to the placement details 205 stored for the representative feature vector 203.

Figure 7:
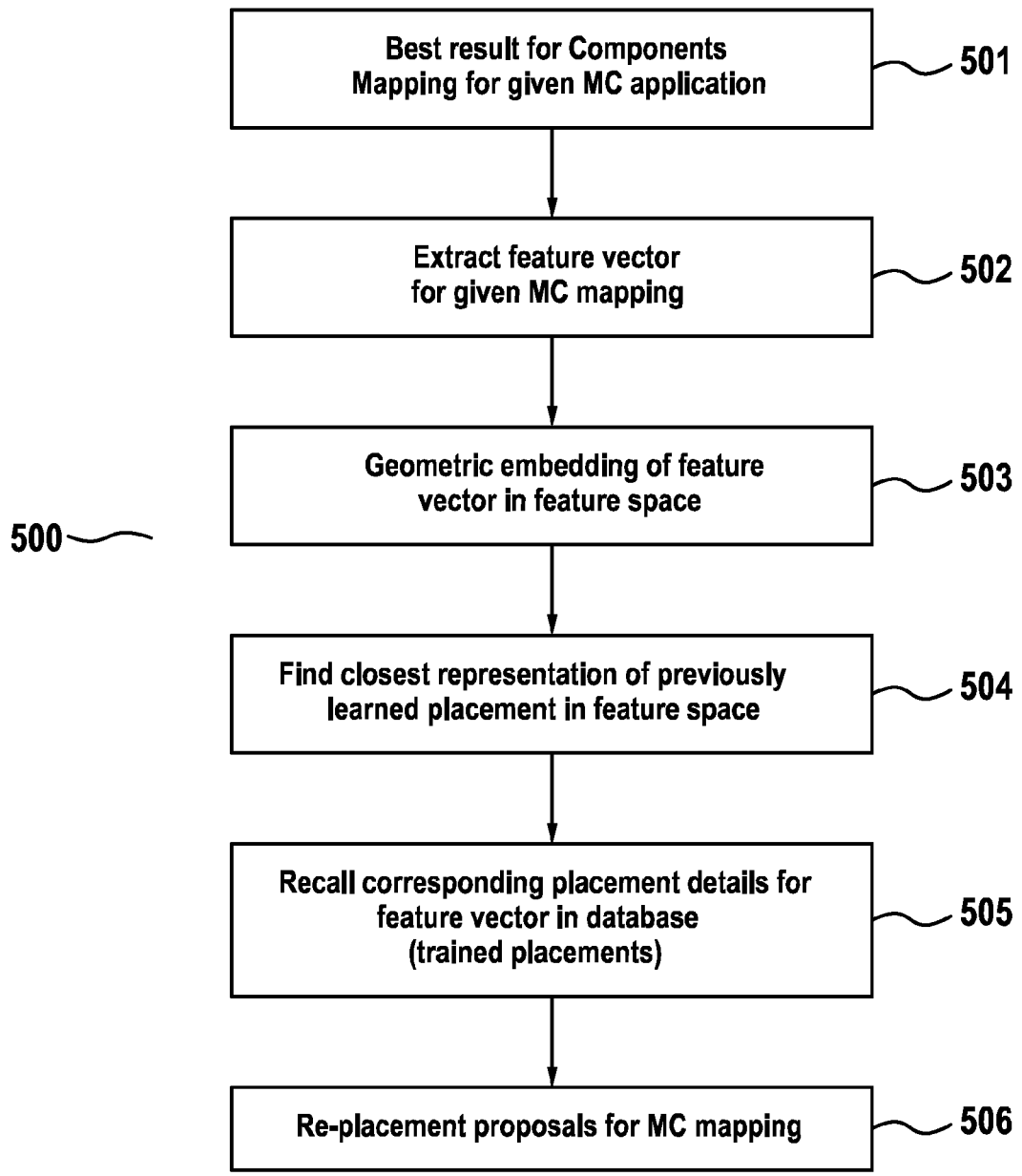
FIG. 7 shows a flow chart of an example method for application placement making use of machine learning.

FIG. 7 shows the flow chart of an example placement method 500 using the placement information stored within the database 204 of a node 101 (step 501). The node 101 observes the control messages related to a new placement request and uses the extracted information to populate a feature vector 203 (step 502) which is embedded into the feature space 200 (step 503). Subsequently, the closest representative feature vector 203 is determined from the database 204 (step 504), thereby determining placement details 205 which may be appropriate for the new placement request (step 505). The new application request may be handled by the node 101 in accordance to the placement details 205 taken from the database 204 of the node 101. Subsequently, the placement may be improved using the distributed placement scheme described in the present document (step 506). It should be noted that the updated placement details and the original feature vector 203 may be used as further training data in the learning method 400.

In the present document, an architecture for a network and corresponding computing devices (nodes) for cloud computing have been described. The described architecture allows for the implementation of a decentralized application component placement scheme, which allows components of applications to be placed at appropriate nodes within a computing cloud. Furthermore, machine learning technology is used to render the application component placement scheme more effective, because the knowledge obtained from past placements in similar situations may be used to rapidly find an optimum mapping for a new application. The described architecture and method is scalable to increasing demands and does not exhibit single points of failure. Furthermore, the described architecture enables the reduction of bandwidth resources required within a communication network when using cloud computing.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A computing device comprising:
   hardware including at least one data processor, wherein said hardware is adapted to:
   receive a plurality of component placement requests for one or more components of a corresponding plurality of applications;
   determine a plurality of feature vectors from the plurality of component placement requests, respectively; wherein each feature vector comprises vector dimensions which describe different attributes of the respective component placement request;
   determine a plurality of placement decisions regarding the plurality of component placement requests, respectively; wherein each placement decision comprises an indication of one or more executing computing devices onto which the one or more components of the respective application have been placed;
   cluster the plurality of feature vectors, thereby yielding one or more clusters; wherein each cluster comprises a default feature vector describing the different attributes of a default component placement request;
   determine a default placement decision for each of the one or more clusters;
   store the one or more default feature vectors and the respective one or more default placement decisions in a database of the computing device;
   receive a new component placement request for one or more components of a new application;
   determine a new feature vector from the new component placement request; and
   determine where to place the one or more components of the new application based on the one or more default feature vectors.

2. The computing device of claim 1, wherein the clustering is performed using a machine learning algorithm, in particular a support vector machine algorithm.

3. The computing device of claim 1, wherein the hardware is further adapted to:
   determine that a first vector dimension of the plurality of feature vectors has a correlation with the corresponding placement decisions which is smaller than a correlation threshold; and
   remove the first vector dimension from the plurality of feature vectors.

4. The computing device of claim 1, wherein the hardware is further adapted to:
   receive control messages from other computing devices; and
   determine the plurality of placement decisions based on the received control messages.

5. The computing device of claim 1, wherein the vector dimensions are indicative of one or more of:

a location of a sink and/or a source of data processed by an application component;

a number of sinks and/or sources processed by an application;

computing resources required by an application component; wherein the computing resources are one or more of: processor resources, memory resources, bandwidth resources;

connection attributes required by an application component; wherein the connection attributes are one or more of: bandwidth, latency, maximum bit error rate; and a graph structure of the one or more components of an application; wherein the graph structure indicates how the one or more components of the application are interlinked.

6. The computing device of claim 1, wherein the hardware is further adapted to:

determine a minimum distance of the new feature vector from the one or more default feature vectors; and if the minimum distance is below a minimum threshold, determine where to place the one or more components of the new application based on the default placement decision corresponding to the default feature vector at the minimum distance from the new feature vector.

7. The computing device of claim 6, wherein the minimum distance is determined based on a weighted difference of the respective vector dimensions of the new feature vector and the one or more default feature vectors.

8. The computing device of claim 6, wherein the hardware is further adapted to:

pass the component placement request to an executing computing device indicated within the default placement decision.

9. The computing device of claim 6, wherein:

the computing device is positioned in a first topological area;

the computing device comprises a topological list indicating a plurality of reference computing devices positioned in a plurality of topological areas other than the first topological area, respectively;

the computing device comprises a local resource list indicating available computing resources of the computing device and of at least one neighbor computing device positioned in a neighborhood of the computing device; and upon determining that the minimum distance is greater than a minimum threshold, the hardware is further adapted to:

determine, based on the topological list, if the one or more components of the new application are to be placed in the first topological area or in one of the plurality of topological areas other than the first topological area;

if it is determined that the one or more components of the new application are to be placed in one of the plurality of topological areas other than the first topological area, pass the component placement request to the reference computing device of the respective topological area of the plurality of topological areas other than the first topological area; and if it is determined that the one or more components of the new application are to be placed in the first topological area, identify from the local resource list a selected computing device having the computing resources for executing the one or more components of the new application.

10. The computing device of claim 1, wherein:

the computing device is a default application server of a point-to-multipoint, a point-to-point or a multipoint-to-multipoint application; and the default application server is a default point of access in a cloud of a plurality of computing devices for setting up the point-to-multipoint, the point-to-point or the multipoint-to-multipoint application.

11. The computing device of claim 1, wherein said hardware is further adapted to:

cause the one or more components of the new application to be placed in accordance with the determination made regarding where to place said one or more components of the new application.

12. A method for placing one or more components of a new application onto a computing device of a media cloud, the method comprising:

receiving a plurality of component placement requests for one or more components of a corresponding plurality of applications;

determining a plurality of feature vectors from the plurality of component placement requests, respectively; wherein each feature vector comprises vector dimensions which describe different attributes of the respective component placement request;

determining a plurality of placement decisions regarding the plurality of component placement requests, respectively; wherein each placement decision comprises an indication of one or more executing computing devices onto which the one or more components of the respective application have been placed;

clustering the plurality of feature vectors, thereby yielding one or more clusters; wherein each cluster is represented by a default feature vector describing the different attributes of a respective default component placement request;

determining a default placement decision corresponding to a default feature vector, for each of the one or more clusters;

storing the one or more default feature vectors and the respective one or more default placement decisions in a database of the computing device; and using the one or more default feature vectors and the respective one or more default placement decisions stored in the database for placing the one or more components of the new application, wherein using comprises:

receiving a new component placement request for one or more components of a new application;

determining a new feature vector from the new component placement request; and determining where to place the one or more components of the new application based on the one or more default feature vectors.

13. The method of claim 12, further comprising:

placing the one or more components of the new application in accordance with the determination made regarding where to place said one or more components of the new application.

* * * * *